(12) United States Patent
Lee

(10) Patent No.: US 7,484,627 B2
(45) Date of Patent: Feb. 3, 2009

(54) EIP PACK FOR SEPARATING OIL FROM WATER

(76) Inventor: Cheon Eok Lee, Mokdong Sinsigaji, Apt. 205-202, Mok-dong 902, Yangcheon-gu, Seoul (KR)

( * ) Notice: Subject to any disclaimer, the term of this patent is extended or adjusted under 35 U.S.C. 154(b) by 0 days.

(21) Appl. No.: 11/851,023

(22) Filed: Sep. 6, 2007

(65) Prior Publication Data
US 2008/0245728 A1   Oct. 9, 2008

(30) Foreign Application Priority Data
Apr. 6, 2007   (KR) .................... 10-2007-0034019

(51) Int. Cl.
*B01D 17/025* (2006.01)
(52) U.S. Cl. .............. 210/522; 210/532.1; 210/538; 210/541; 210/DIG. 5
(58) Field of Classification Search ............. 210/521, 210/522, 532.1, 538, 540, 541, DIG. 5
See application file for complete search history.

(56) References Cited

U.S. PATENT DOCUMENTS

| | | | | |
|---|---|---|---|---|
| 2,314,977 A | * | 3/1943 | Green | 210/522 |
| 2,570,304 A | * | 10/1951 | Bach | 210/522 |
| 2,793,186 A | * | 5/1957 | Anderson et al. | 210/521 |
| 3,306,456 A | * | 2/1967 | Fromson et al. | 210/521 |
| 4,737,282 A | * | 4/1988 | Senyard et al. | 210/521 |
| 4,816,146 A | * | 3/1989 | Schertler | 210/522 |
| 4,921,609 A | * | 5/1990 | Fromson | 210/521 |
| 4,988,441 A | * | 1/1991 | Moir | 210/522 |
| 6,089,381 A | * | 7/2000 | Gordon | 210/540 |

FOREIGN PATENT DOCUMENTS

KR   10-0732052   6/2007

\* cited by examiner

*Primary Examiner*—Christopher Upton
(74) *Attorney, Agent, or Firm*—Peter A. Nieves, Esq.; Sheehan Phinney Bass + Green PA

(57) ABSTRACT

An oil-water separation pack includes an upper body having cross-sectional shape narrowing from a bottom to a top. The upper body includes an oil rising region provided in an inside central portion thereof, and an oil-discharging opening provided in a top portion thereof. A lower body disposed beneath the upper body includes a plurality of oblique flow-in ports, which allow an oil-water mixture to flow obliquely into an inside portion thereof and flows of the oil-water mixture to collide with each other and stagnate in the inside portion of the lower body, thereby enabling the oil to float and be separated from water. A coupling unit integrally couples a bottom portion of the upper body with a top portion of the lower body, thereby forming a continuous space extending from the lower body to the upper body. The continuous space allows oil to float therethrough.

10 Claims, 6 Drawing Sheets

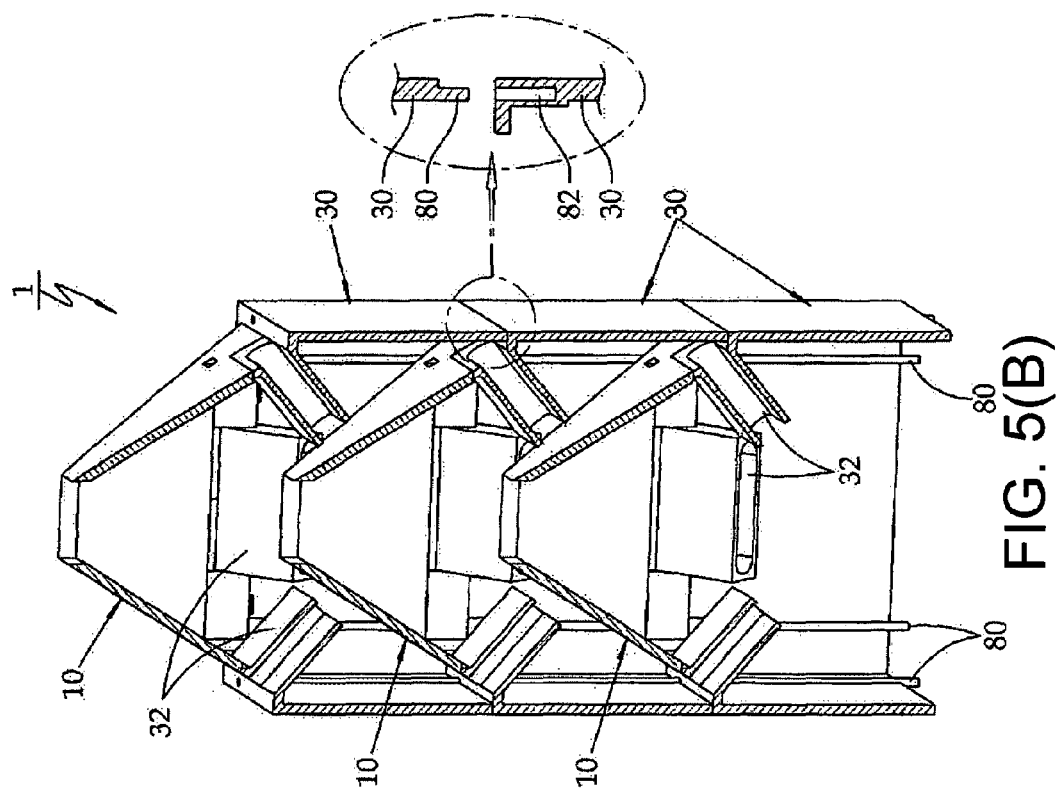
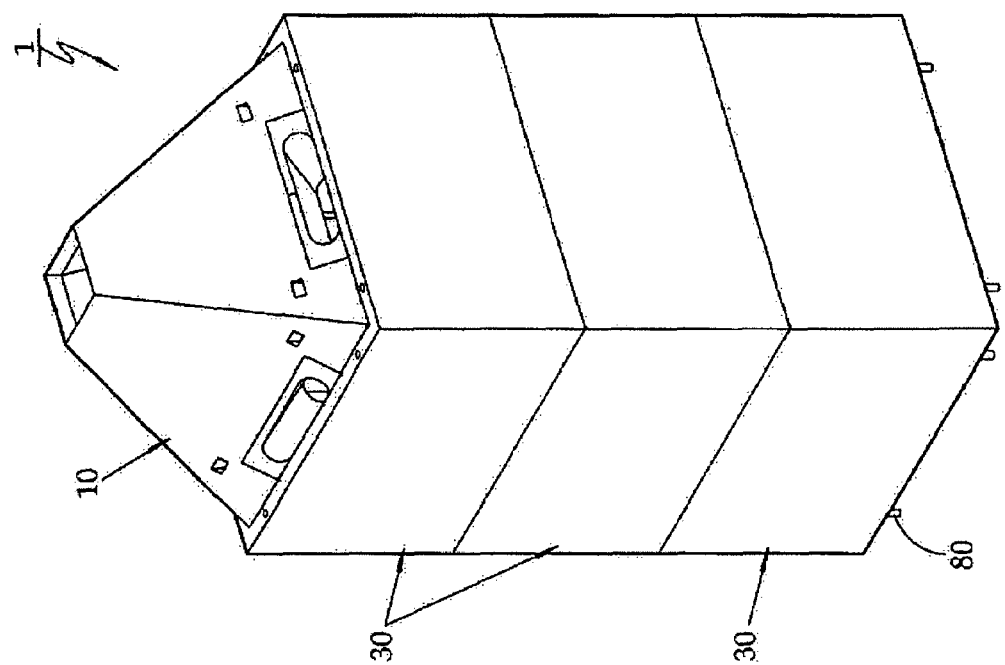
FIG. 5(A)
FIG. 5(B)

EIP PACK FOR SEPARATING OIL FROM WATER

BACKGROUND OF THE INVENTION

1. Field of the Invention

The invention relates to an oil-water separation apparatus for separating oil from water, and more particularly, to an effective oil interceptor plate (EIP) pack for separating oil from water by floating the oil, which is disposed inside an oil-water separation bath, and causes significant changes in a flow direction of an oil-water mixture to induce a non-laminar flow in the oil-water mixture and hence cohesions of oil particles, and allows the oil to safely float without disturbance and be separated from water, thereby further improving the capacity of separating oil from water.

2. Description of the Related Art

In general, an apparatus for automatically discharging floating oil is most widely used in the industry fields. In order to separate oil from water, the apparatus adopts a principle that, oil and water exist as a suspending solution, mingled with each other, when maintained in a vortex state, but an oil layer can be separated from a water layer due to the difference in specific gravity between oil and water, when maintained in a calm state.

In the case of an oil-containing liquid, i.e., an oil-water mixture introduced into a floating oil automatic discharging bath, the layer separation cannot easily occur when oil and water have a small difference in specific gravity, whereas the layer separation can occur without a difficulty when the oil and water have a large difference in specific gravity. In particular, fine oil particles may be passed to subsequent processing equipment on water before oil is separated from water. In order to prevent this, the oil-water separation bath must have a sufficient depth, which, however, causes a disadvantage in that the size of the oil-water separation bath is excessively lager.

As an approach to solve such problems, corrugated plates having holes are stacked so as to form packs, which are vertically or horizontally arranged in the inside of the oil-water separation bath. According to the prior art approach mentioned above, while an oil-water mixture passes through the horizontally arranged corrugated packs, fine oil particles mingled in water collide with corrugated plates and cohere with each other, thereby having a larger buoyancy not to be drifted away by the flow of the oil-water mixture, and float on the water surface through the holes perforated in the top end of the corrugated plates. The oil floating on the water surface flows out through a skimmer so as to gather in an oil separation barrel mounted on the outside of the oil-water separation bath, and processed water from which oil is removed flows into subsequent processing equipment.

However, the prior art mentioned above has the following problem. When sludge with a relatively larger specific gravity accumulates on the corrugated pates, the collision of the oil-water mixture with the plates can be weakened, so as to reduce efficiency of oil separation. As a result, it is necessary to periodically disassemble the oil-water separation bath needed in order to remove the sludge from the corrugated plates.

In order to solve the prior art problem mentioned above, a technology is suggested in Korean Patent No. 0119390. In this technology, an oil-water mixture is separated by means of oval-shaped plates, which are stacked in several layers, and are disposed within an oil-water separation bath, so that sludge can gather on and be discharged naturally from a bottom portion of the oil-water separation bath. In addition, even in the case of periodic cleaning, the sludge is naturally discharged only by flushing using water without the disassembling of the oil-water separation bath.

However, although the sludge can be removed effectively, the prior art mentioned above has problems in that water and oil cannot flow and be dispersed uniformly, and floating oil can be drifted away on a water flow while rising on water. In addition, oil agglomeration or oil containing sludge with a specific gravity similar to that of water, i.e., a specific gravity of about 1.0 cannot be easily separated.

SUMMARY OF THE INVENTION

The invention has been devised to solve the prior art problems mentioned above, and an object thereof is to provide an improved oil-water separation pack, in which fine oil particles can collide and cohere with each other so as to form larger oil particles, thereby improving oil separation capacity.

Also, another object of the invention is to provide an improved oil-water separation pack, in which the floating oil can stably flow upward to be separated from water without being disturbed by the flow of an introduced oil-water mixture, thereby providing further improved capacity of separating oil from water.

Additionally, a further object of the invention is to provide an improved oil-water separation pack, in which sludge contained in a oil-water mixture can flow down along the flow direction of water from which oil is removed, such that the sludge can be effectively removed, thereby stably maintaining improved capacity of separating oil from water.

In order to achieve the objects mentioned above, the invention provides an oil-water separation pack for separating oil from water, which includes an upper body having a cross-sectional shape narrowing from the bottom to the top, the upper body including an oil rising region provided in an inside central portion thereof, and an oil-discharging opening provided in the top portion thereof; a lower body disposed beneath the upper body, the lower body including a plurality of oblique flow-in ports for allowing an oil-water mixture to flow obliquely into an inside portion thereof, and flows of the oil-water mixture, obliquely introduced into the inside of the lower body, to collide with each other and stagnate in the inside portion of the lower body, thereby enabling the oil to float and be separated from water; and a coupling unit integrally coupling a bottom portion of the upper body with a top portion of the lower body, thereby forming a continuous space extending from the lower body to the upper body, the continuous space allowing oil to float therethrough.

BRIEF DESCRIPTION OF THE DRAWINGS

FIG. 5 is a view showing a vertically stacked state of the oil-water separation packs according to the invention, where (a) is an perspective view showing an outer appearance thereof, and (b) is a vertical sectional view thereof.

DETAILED DESCRIPTION OF THE PREFERRED EMBODIMENTS

Now, the preferred embodiment of the invention will be described in detail with reference to the accompanying drawings.

Figure 1:
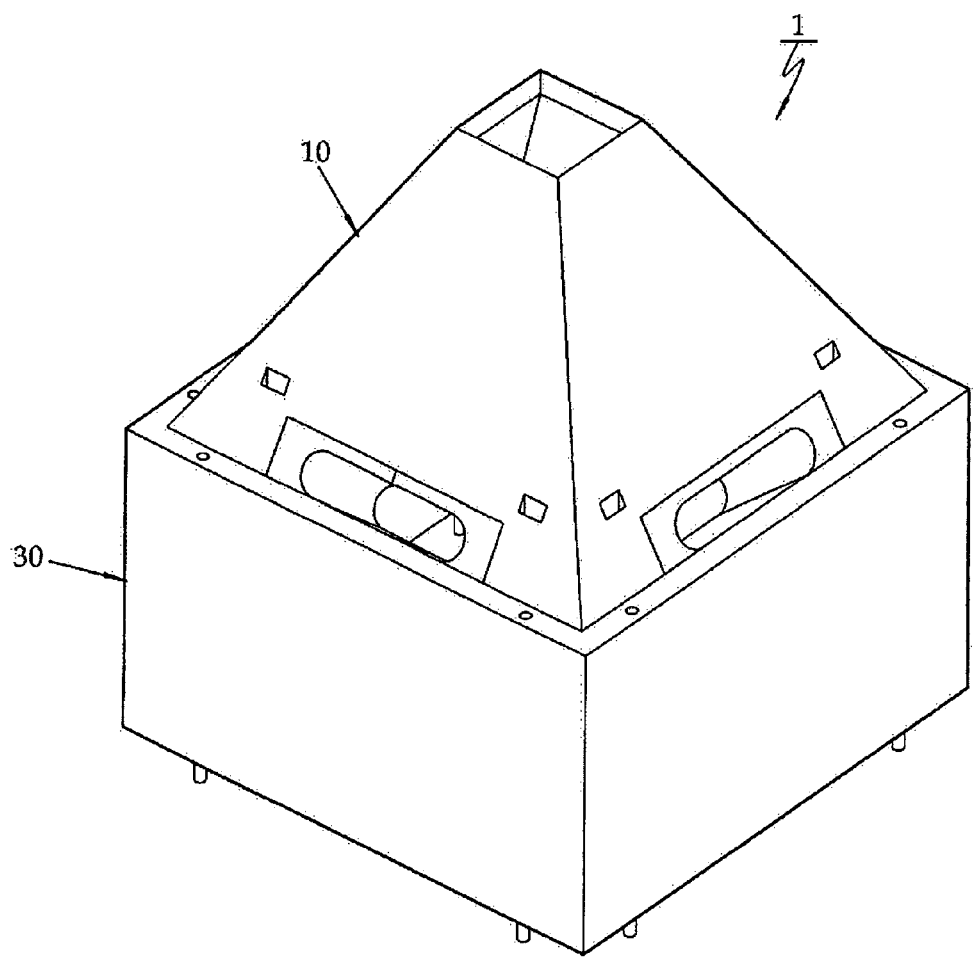
FIG. 1 is a perspective view showing an outer appearance of an oil-water separation pack according to the invention.
Figure 4:
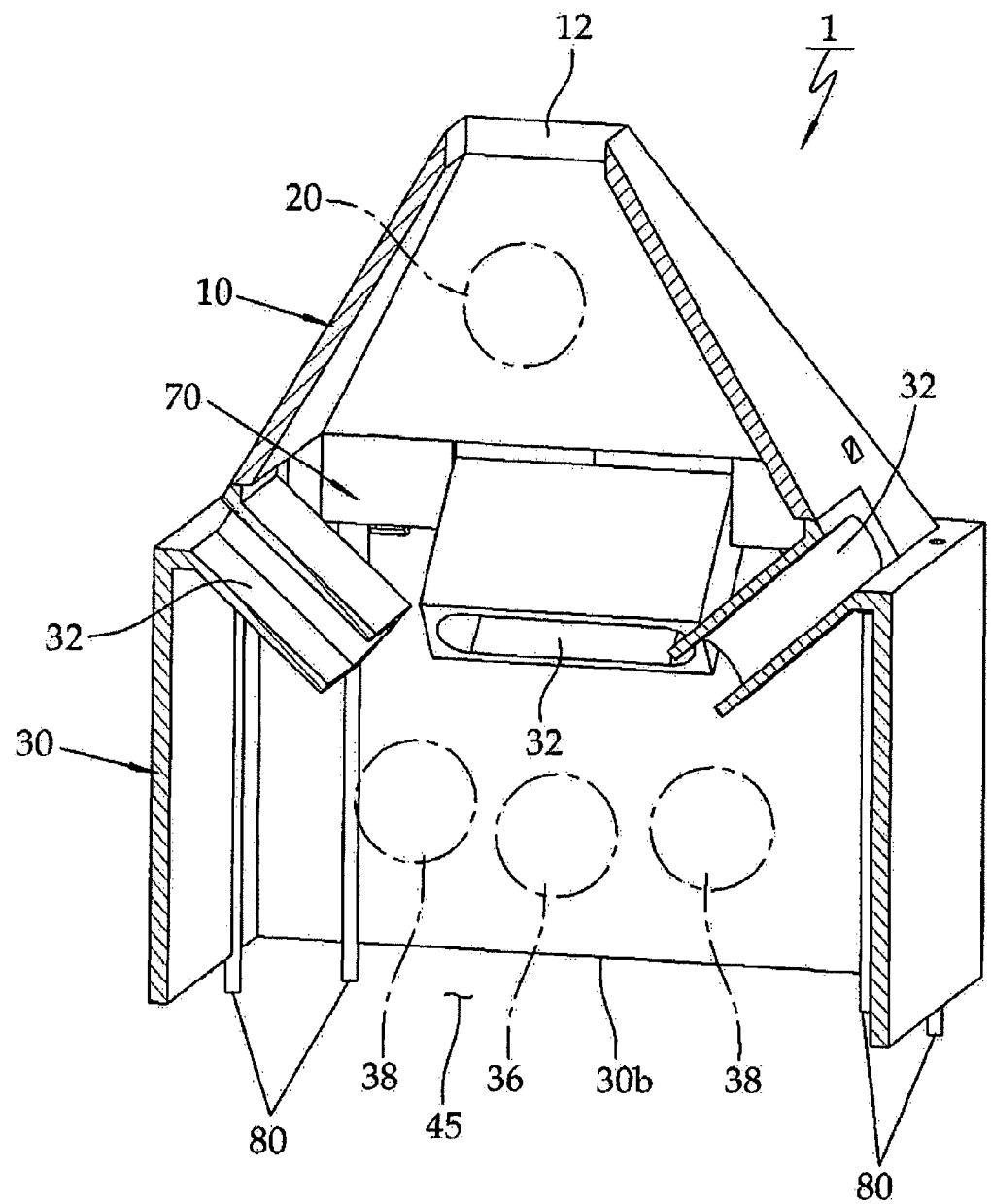
FIG. 4 is a vertical sectional view of the oil-water separation pack according to the invention.

An oil-water separation pack 1 according to the invention is an apparatus for separating oil and water contained in an oil-water mixture. As generally shown in FIGS. 1 and 4, the oil-water separation pack 1 according to the invention includes an upper body 10, a lower body 30, and a coupling unit 70 for integrally coupling the upper body 10 with the lower body 30.

Figure 2A:
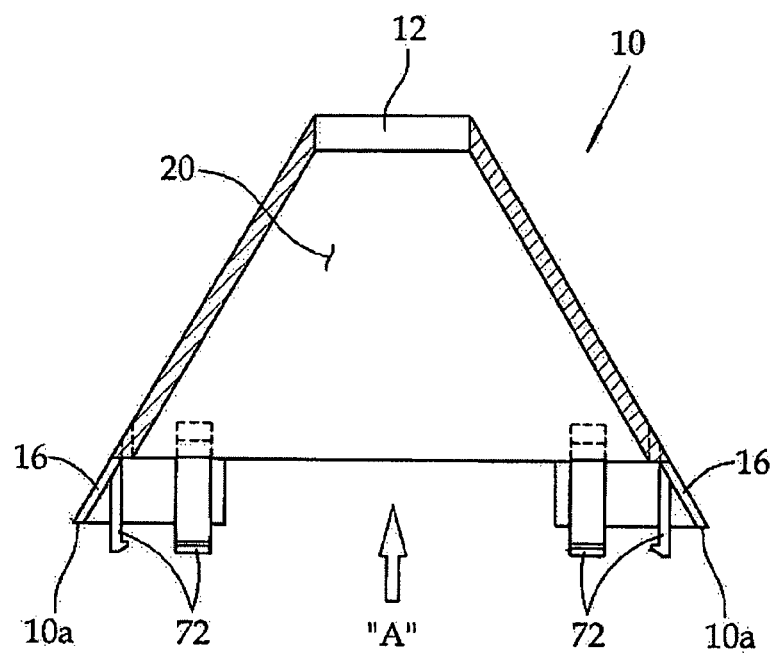
FIG. 2 is a view showing a upper body of the oil-water separation pack according to the invention, where (a) is a longitudinal sectional view thereof, and (b) is a rear view seen from an arrow A.
Figure 2B:
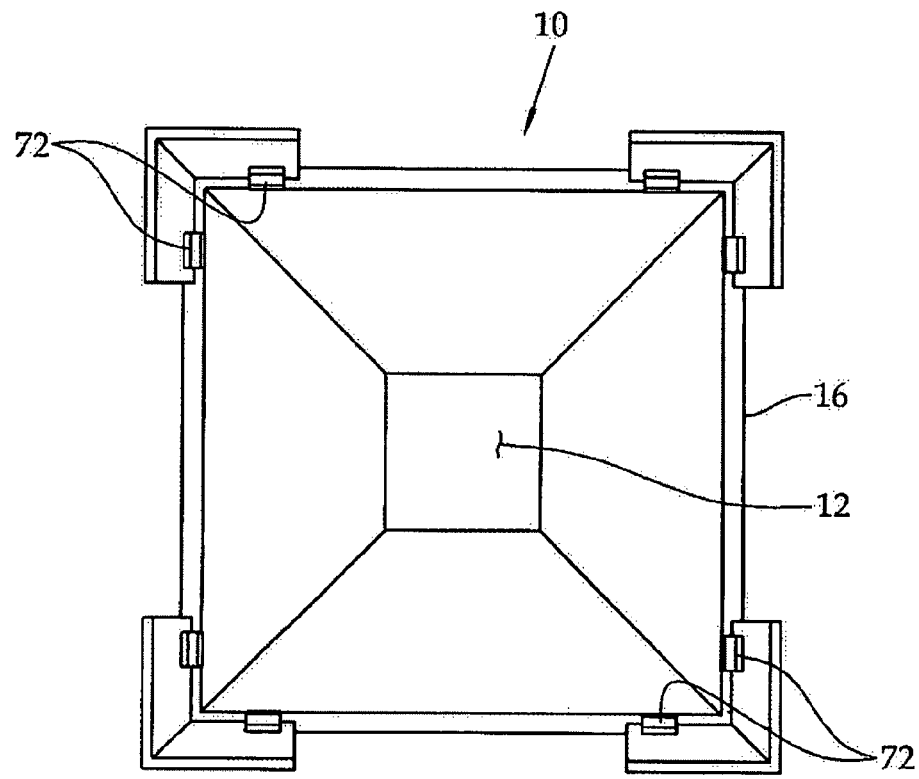

As shown in FIGS. 2(a) and 2(b), the upper body 10 has a cross-sectional structure narrowing from the bottom end to the top end. An oil rising region 20 for floating oil, separated from water, is provided inside the center of the upper body 10, and an oil-discharging opening 12 is provided on the top end of the upper body 10.

Preferably, the upper body 10 has a quadrangular pyramid shape, and includes cut-out portions 16 formed at respective bottom edges 10a thereof. In each of the cut-out portions 16, a respective oblique flow-in port 32 of the lower body 30 is disposed.

The upper body 10 having the structure as mentioned above is structurally stabilized in that the cross section thereof has a narrower area at the top end and a wider area at the bottom end. The inside of the upper body 10 defines a void space to form the oil rising region 20 described below. In addition, when the upper body 10 is coupled with the lower portion 30, the cut-out portions 16 allow the oblique flow-in ports 32 to be respectively disposed therein, such that the bottom edges 10a of the upper body 10 can be closely attached to toe top edges 30a of the lower body 30.

Figure 3A:
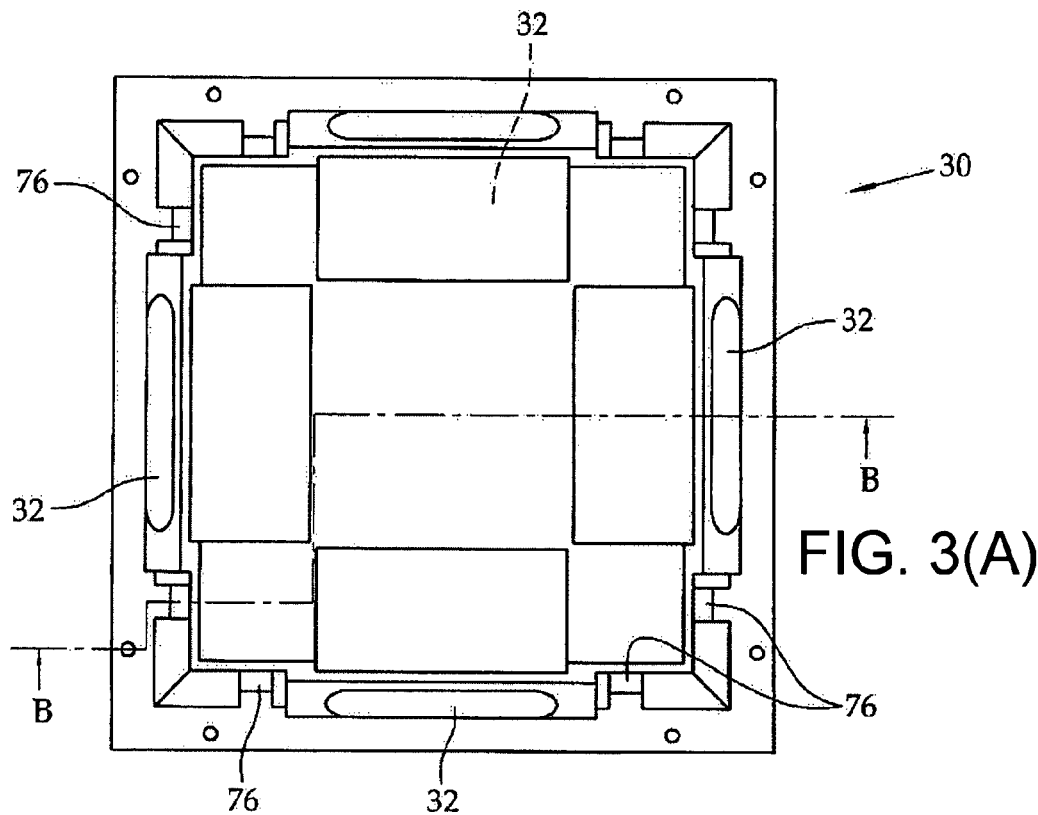
FIG. 3 is a view showing a lower body of the oil-water separation pack according to the invention, where (a) is a plan view thereof, and (b) is a longitudinal sectional view taken along a line "B-B"
Figure 3B:
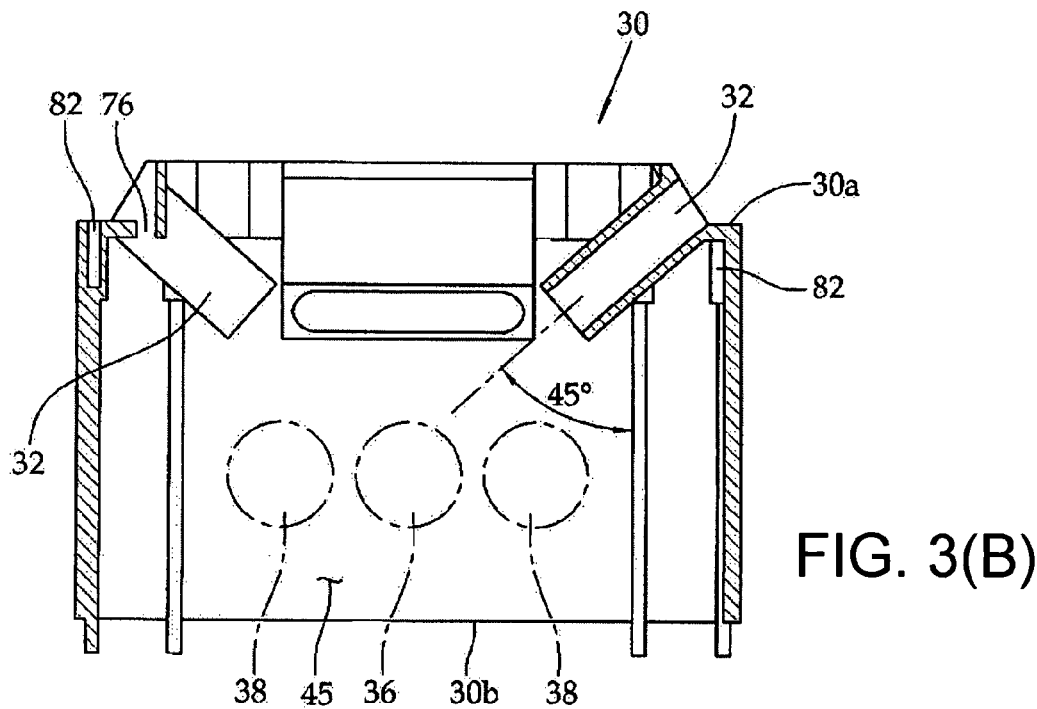

Further, as shown in FIGS. 3(a) and 3(b), the lower body 30 is located beneath the bottom end of the upper body 10, and includes a plurality of oblique flow-in ports 32 formed to allow an oil-water mixture to flow obliquely into the inside thereof, thereby dispersing the oil-water mixture while guiding the oil-water mixture to flow from the outside into the inside thereof. Flows of the oil-water mixture, obliquely introduced into the inside from the outside as above, can collide against each other and stagnate inside the lower body 30, so that floating oil can be separated from water.

Preferably, the lower body 30 has a quadrangular cross section, shaped the same as that of the bottom edges 10a of the upper body 10. Each of the oblique flow-in ports 32 formed on a respective top edge 30a thereof extends obliquely inwardly. The oblique flow-in port 32 forms a tube-shaped flow path in order to give an oblique orientation to an introduced flow of the oil-water mixture.

Also, according to the invention, the lower body 30 includes a colliding region 36 provided in the inside center thereof, in which the oil-water mixture flows with the oblique orientation, introduced through the flow paths of the oblique flow-in ports 30, can collide with each other, and stagnation regions 38 provided around the colliding region 36, in which floating oil is separated from water.

In the lower body 30 as mentioned above, each of the oblique flow-in ports 32 is obliquely formed on the respective top edge 30a, preferably, at an angle of about 45° so as to form the tube-shaped flow paths with a predetermined length. Therefore, if the oil-water mixture passes through the oblique flow-in ports 32, a oblique orientation is caused to the oil-water mixture during passing through an inlet and outlet of the oblique flow-in ports 32, such that the oil-water mixture can be directed to the colliding region 36 formed in the inside center of the lower body 30.

Consequently, the flows of the oil-water mixture introduced into the colliding region 36 collide with each other within the colliding region 36, thereby inducing collisions and cohesions of oil bubbles, so that fine oil particles can cohere with each other, and thus the floating cohered oil particles are separated from water in the stagnation region 38.

Furthermore, as shown in FIG. 4, the upper body 10 and the lower body 30 are integrally coupled with each other by the coupling unit 70, which is configured to integrally couple the bottom end of the upper body 10 with the top end of the lower body 30 so as to form a continuous space extending from the lower body 30 to the upper body 10 and allowing oil to float therethrough.

Preferably, the coupling unit 70 includes a plurality of snap-fit projections 72 protruding downward from the bottom edges 10a of the upper body 10, and a plurality of fitting groove 76 formed on the top edges of the lower body 30 to receive the snap-fit projections 72 therein.

That is, the plurality of snap-fit projections 71 protrude downward by a predetermined length from the bottom edges of the upper body 10, and the plurality of fitting grooves 72 are formed as a recess on the top edges of the lower body 30. Thus, when the upper body 10 and the lower body 30 are coupled together by mating and pressing each other, the snap-fit projections 72 and the fitting grooves 76 are aligned and integrally coupled with each other.

The oil-water separation pack 1 according to the invention configured as above, that is, in a coupled state of the upper body 10 and the lower body 30, can effectively separate oil from water in the oil-water mixture, and facilitate the floating of the oil.

In the oil-water separation pack 1 according to the invention, the oil-water mixture located at the outside of the upper portion 10 can be introduced into the inside of the lower body 30 through a plurality of oblique flow-in ports 32 formed on the lower body 30. The oil-water mixture flows can collide with each other in the inside center of the lower body 30, since the plurality of oblique flow-in ports 32 are oppositely formed in an oblique position and give an orientation to the oil-water mixture flows.

Specifically, the oil-water mixture flows can be directed to the colliding region 36, provided in the inside center of the lower body 30, and be introduced in different directions to collide with each other at a single region, thereby causing fine oil particles contained in the oil-water mixture to lightly collide with each other and cohere into lager oil particles. Then, as the cohered oil particles flow into the stagnation region 38, formed around the colliding region 36, and flow rates thereof are decreased, the floating separation of the oil particles from water can be facilitated.

Subsequently, the floating oil particles separated from water rise to the top end of the lower body 30 through a passage formed between the oblique flow-in ports 32 of the lower body 30, and are introduced into the inside of the upper body 10 so as to rise into the oil rising region 20, and then are discharged outside through the oil-discharging opening 12 formed at the top end of the upper body 10.

Meanwhile, water and sludge, from which the oil particles are separated, are discharged through a lower part, that is, a discharging passage 45 formed inside of the bottom edges 30b of the lower body 30 due to relatively greater specific gravities of the water and sludge.

In the oil floating separation process mentioned above, the oil particles can flow through the oil rising region 20 and the oil-discharging opening 12 provided inside the upper body 10. However, the oil rising region 20 and the oil-discharging opening 12 define a space completely isolated from any outside oil-water mixture flows by the upper body 10, so that the oil particles can stably flow through the space.

In other words, the floating oil particles separated from water are completely isolated from the oil-water mixture flows outside the upper body 10. This can stably achieve the floating separation without disturbance, thereby maximizing the floating separation effects.

Meanwhile, as shown in FIG. 5, the oil-water separation pack 1 according to the invention as mentioned above may also have a vertically stacked structure in order to further improve the oil separation effects.

In this case, the bottom edges of the upper body 10 have an outer dimension less than that of the top edges of the lower body 30. Thus, when the upper body 10 and the lower body 30 are coupled together, the top edges 30a of the lower body 30 extend outwardly beyond the bottom edges 10a of the upper body 10.

In addition, according the invention, the bottom edges 10a of the upper body 10 have an outer dimension, preferably, equal to the inner dimension of the bottom edges 30b of the lower body 30. Thus, the upper body 10 can be inserted into another lower body 30 capped thereon.

Since the upper body 10 can be inserted into the lower body 30 as mentioned above, a plurality of upper bodies 10 and a plurality of lower bodies 30 can be successively arranged, thereby forming a vertically stacked structure.

Also, in the vertically stacked structure, the lower body 30 includes a plurality of fixing pins 80 protruding downward from the bottom edges 30b thereof, and a plurality of fitting holes 82 formed on the top edges 30a thereof to couple with the fixing pins 80.

Therefore, when a plurality of lower bodies 30 are vertically stacked, the bottom edges of one lower body 30 make face-to-face contacts with the top edges of an underlying lower body 30, and each of the fixing fins 80 is coupled into the respective fitting hole 80, thereby achieving a stably stacked structure.

Furthermore, when a plurality of upper bodies 30 are stacked by inserting one upper body 10 into an overlying lower body 30, outer surfaces of the upper bodies 30 as shown in FIG. 5(b) are arranged with a predetermined interval from the outlets of the oblique flow-in ports 32, thereby forming colliding surfaces into which the oil-water mixture introduced through the oblique flow-in ports 32 will collide.

In the stacked structure mentioned above, an oil-water mixture, introduced through oblique flow-in ports 32 of a lower body 30 located at a highest level are 3, changes its direction and flows down by the collision with the outer surfaces of a second highest upper body 10, disposed in the inside of the highest lower body 30. Thereafter, the oil-water mixture is again introduced into a second highest lower body 30, coupled with the second highest upper body 10, through oblique flow-in ports 32 of the second highest lower body 30. In this case, the oil-water mixture can change its direction again by the collision with a third highest upper body 10 and then is introduced into a third highest lower body 30 through oblique flow-in ports 32 thereof. That is, the oil-water mixture can flow down while repeating the process mentioned above, for several times.

In the process mentioned above, oil particles in the oil-water mixture can collide with each other on the outer surfaces of the upper bodies 30, so that fine oil particles can effectively cohere with each other, but in the inside of the lower body 30 located at a lowest level, flow through the colliding region 36 into the stagnation region 38. As a result, larger particles, obtained from the cohering of the fine oil particles, can float toward the highest level, thereby rising through the oil rising regions 20 of a plurality of upper bodies 10, successively stacked to define a long channel.

During the rising process of oil component, the oil particles can stably float and be separated without disturbance, since the plurality of stacked upper bodies 30 define a continuous channel in the inside thereof, and oil particles in the inside of the channel are completely isolated from an outside oil-water mixture flow flowing down in a space between the stack of the upper bodies 10 and the lower bodies 30.

Figure 6:
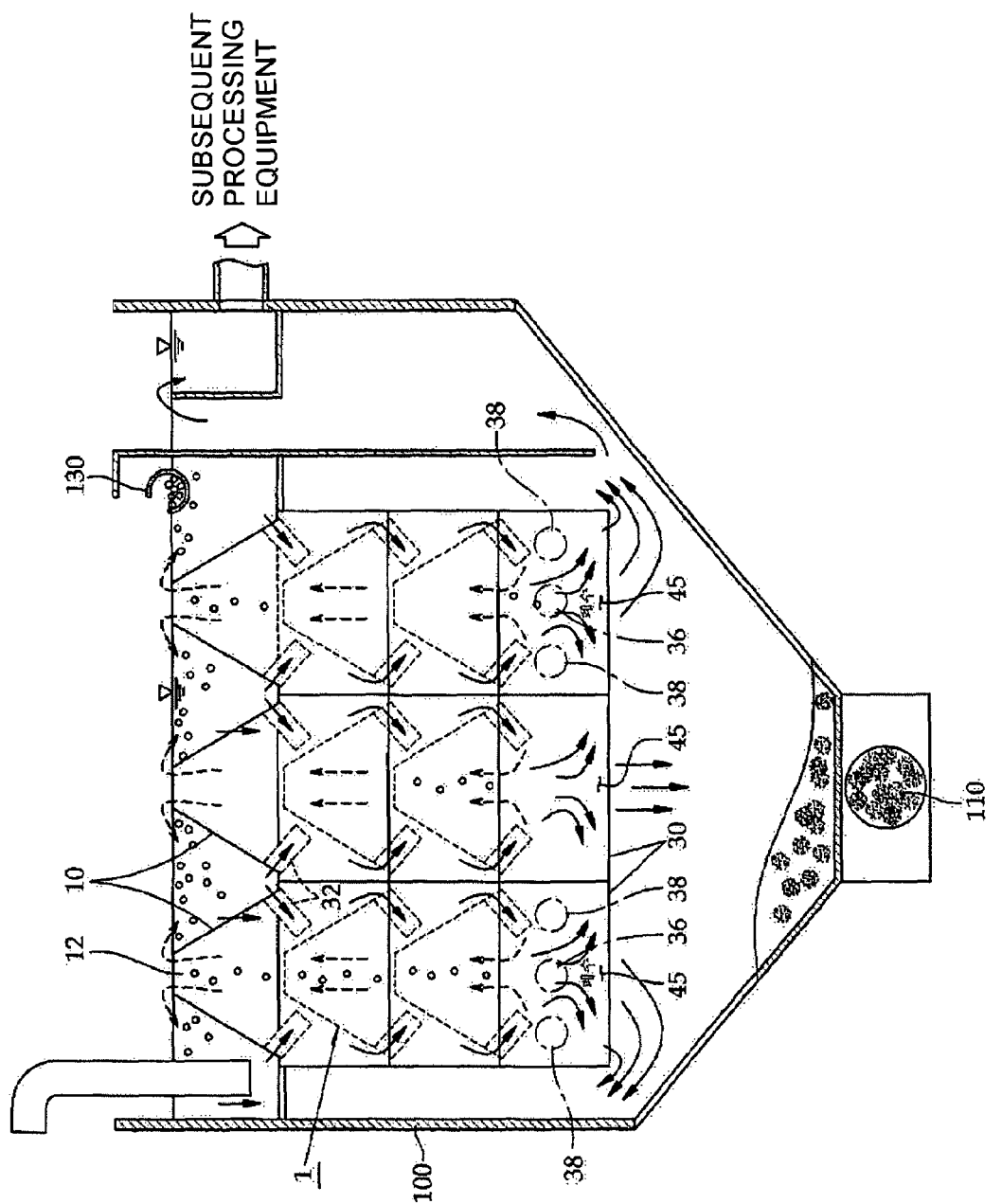
FIG. 6 is a sectional view showing the oil-water separation packs disposed inside an oil-water separation bath according to the invention.

FIG. 6 shows a structure including a plurality of the oil-water separation packs 1 according to the invention, which are vertically and horizontally stacked and are disposed in an oil-water separation bath 100. When the plurality of the oil-water separation packs 1 are disposed in the oil-water separation bath 100 as mentioned above, an oil-water mixture is introduced to the outside of the upper bodies 10 located at a highest level. Then, the oil-water mixture can be introduced into the inside of the highest lower bodies 30 through oblique flow-in ports 32 formed therein, and flows along the outer surfaces of the stacked upper bodies 10 while successively flowing down.

Meanwhile, oil can float in the inside of the lowest lower bodies 30 after passing through colliding regions 30 and stagnation regions 38 provided therein, and water and sludge can be discharged through a lower part such as discharging passages 45, such that sludge having a specific gravity greater than that of water can precipitate toward a sludge discharging port 110, formed on the bottom of the oil-water separation bath 100, and water can flow out toward an adjoining subsequent processing equipment (not shown).

Meanwhile, the floating oil separated form the oil-water mixture can rise through the insides of the successively-stacked upper bodies 10, and then be discharged through oil-discharging openings 12, formed on the highest upper bodies 10. The discharged oil can form an oil layer over the oil-water mixture because the specific gravity of the oil is lower than that of the oil-water mixture, and exit the oil-water separation bath 100 through an oil skimmer 130, provided in the oil-water separation bath 100. By means of the processes mentioned above, the oil-water mixture introduced into the oil-water separation bath 100 can be completely separated into oil and water.

Although the invention has been described in detail above with reference to the particular embodiments in conjunction with the accompanying drawings, the invention is not limited to the particular constructions and embodiments as mentioned above. Accordingly, it will be obvious that the invention may be variously modified and changed by those skilled in the art without departing form the scope and spirit of the invention defined in the appended claims. For example, the upper and lower bodies may be modified in the sizes thereof and/or in the number thereof stacked together. In addition, the cross section of the upper body may be variously changed, and correspondingly, the cross section of the lower body may be also changed. However, it will be obvious that such modifications and changes in size and geometry will fall in the scope of the invention.

As mentioned above, the floating separation of oil from an oil-water mixture according to the invention can impart a predetermined orientation to the flows of the oil-water mixture, so that fine oil particles can collide with each other, and can induce non-laminar flows, thereby enhancing the possibility of the oil particles to cohere together so as to increase the sizes of the oil particles, and hence improving the oil separation performance.

In addition, according to the invention, when oil is separated and floated from water, the flow of the oil can stably rise upward without being disturbed by a distinct oil-water mixture flow, thereby providing a further improved capacity of oil separation from the water.

Furthermore, according to the invention, the sludge removal can be effectively achieved since sludge contained in the oil-water mixture can flow downward and be discharged on the water. In addition, the sludge can be discharged without being accumulating in anywhere of the insides of on the upper and lower bodies so as not to obstruct the flow of the oil-water mixture. Therefore, the invention has significant effects in that the oil floating separation performance can be always stably maintained.

What is claimed is:

1. An oil-water separation pack for separating oil from water, comprising:
   an upper body having a cross-sectional shape narrowing from a bottom to a top, the upper body including an oil rising region provided in an inside central portion thereof, and an oil-discharging opening provided in a top portion thereof;
   a lower body disposed beneath the upper body, the lower body including a plurality of oblique flow-in ports for allowing an oil-water mixture to flow obliquely into an inside portion thereof, and flows of the oil-water mixture, obliquely introduced into the inside of the lower body, to collide into each other and stagnate in the inside portion of the lower body, thereby enabling the oil to float and be separated from water; and
   a coupling unit for integrally coupling a bottom portion of the upper body with a top portion of the lower body, thereby forming a continuous space extending from the lower body to the upper body, the continuous space allowing oil to float therethrough.

2. The oil-water separation pack as claimed in claim 1, wherein the upper body has a quadrangular pyramid shape, and includes cut-out portions, each of which is formed on a respective bottom edge thereof, and wherein the oblique flow-in ports of the lower body are disposed in the cut-out portions.

3. The oil-water separation pack as claimed in claim 2, wherein the bottom edges of the upper body have an outer dimension less than that of top edges of the lower body.

4. The oil-water separation pack as claimed in claim 3, wherein the bottom edges of the upper body have the outer dimension equal to an inner dimension of the bottom edges of the lower body, thereby allowing the upper body to be inserted into another one of the lower body 30, which is disposed on the upper body, wherein a plurality of the upper and lower bodies are successively arranged in a vertically stacked structure.

5. The oil-water separation pack as claimed in claim 4, wherein, when the plurality of upper bodies are stacked by inserting one upper body into an overlying lower body, outer surfaces of the upper bodies are arranged with an interval from outlets of the oblique flow-in ports, thereby forming colliding surfaces with which the oil-water mixture introduced through the oblique flow-in ports collides.

6. The oil-water separation pack as claimed in claim 4, wherein, said stacked structure forms means to separate oil from the oil-water mixture introduced therein within a stagnation region, such that the oil rises and is discharged through a space between the oblique flow-in ports and through the upper body while water and sludge are discharged through a passage at a lower portion of the lower body.

7. The oil-water separation pack as claimed in claim 1, wherein the lower body has a quadrangle cross sectional shape, and each of the oblique flow-in ports is formed obliquely inwardly on each of top edges of the lower body, the oblique flow-in port forming a tube-shaped flow path so as to give an oblique orientation to introduced flows of the oil-water mixture.

8. The oil-water separation pack as claimed in claim 7, wherein the lower body includes a colliding region provided in an inside central portion thereof, in which the oil-water mixture, introduced through the flow paths of the oblique flow-in ports with the oblique orientation, is allowed to collide with each other, and a stagnation region provided around the colliding region, in which the oil is allowed to float and be separated from the water.

9. The oil-water separation pack as claimed in claim 8, wherein the lower body includes a plurality of fixing pins protruding downward from bottom edges thereof and a plurality of fitting holes formed on the top edges thereof to couple with the fixing pins, and when a plurality of the lower body is vertically stacked, the bottom edges of one lower body are face-contacted with the top edges of an underlying lower body, and each of the fixing pins are coupled into the respective fitting hole, thereby achieving a stacked structure.

10. The oil-water separation pack as claimed in claim 1, wherein the coupling unit includes a plurality of snap-fit projections, protruding downward from the bottom edges of the upper body, and a plurality of fitting groove, formed on top edges of the lower body to receive the snap-fit projections.

* * * * *